(12) United States Patent
Gruhn et al.

(10) Patent No.: US 7,450,587 B2
(45) Date of Patent: Nov. 11, 2008

(54) METHOD FOR TRANSMITTING PACKET INFORMATION IN A RADIO COMMUNICATION SYSTEM

(75) Inventors: Thomas Gruhn, Berlin (DE); Christoph Mecklenbraeuker, Vienna (AT); Fariba Raji, Vienna (AT); Frank Wegner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 926 days.

(21) Appl. No.: 10/204,036

(22) PCT Filed: Feb. 14, 2001

(86) PCT No.: PCT/DE01/00561

§ 371 (c)(1),
(2), (4) Date: Oct. 25, 2002

(87) PCT Pub. No.: WO01/62021

PCT Pub. Date: Aug. 23, 2001

(65) Prior Publication Data

US 2003/0053440 A1 Mar. 20, 2003

(30) Foreign Application Priority Data

Feb. 18, 2000 (DE) ............................ 100 07 602

(51) Int. Cl.
*H04L 12/54* (2006.01)
(52) U.S. Cl. ...................................... 370/394; 370/473

(58) Field of Classification Search ................. 370/235, 370/313, 328, 335, 337, 349, 394, 473, 474; 455/65.11; 714/701, 748
See application file for complete search history.

(56) References Cited

U.S. PATENT DOCUMENTS 5,818,826 A  10/1998  Gfeller et al.
5,872,777 A   2/1999  Brailean et al.

(Continued)

FOREIGN PATENT DOCUMENTS

EP  618 706  10/1994

(Continued)

OTHER PUBLICATIONS

"Support of Hybrid Arq Type II/III in the Physical Layer," TSGR1#4(99)355, TSG-RAN Working Group 1 Meeting #4, Seimens AG, Shin-Yokohama, Japan 18 (Apr. 19-20, 1999, p. 1-4.*

(Continued)

*Primary Examiner*—Wing F. Chan
*Assistant Examiner*—Mark A. Mais
(74) *Attorney, Agent, or Firm*—Staas & Halsey LLP

(57) ABSTRACT

In a packet data transmission via a radio interface of a communication system, a packet number as identification information is transmitted for every data packet between data stations communicating with one another. To improve transmission security for the identification information, the identification information is multiplied and distributed separately to at least two data packets or transmitted separately in a separate information data packet.

21 Claims, 4 Drawing Sheets

U.S. PATENT DOCUMENTS

| | | | |
|---|---|---|---|
| 6,247,150 B1 * | 6/2001 | Niemela | 714/701 |
| 6,359,877 B1 * | 3/2002 | Rathonyi et al. | 370/349 |
| 6,445,717 B1 * | 9/2002 | Gibson et al. | 370/473 |
| 6,731,623 B2 * | 5/2004 | Lee et al. | 370/349 |
| 7,020,822 B2 * | 3/2006 | Ho et al. | 714/748 |
| 7,035,894 B2 * | 4/2006 | Park et al. | 709/200 |
| 7,061,915 B2 * | 6/2006 | Seidel et al. | 370/394 |
| 7,075,917 B2 * | 7/2006 | Herrmann | 370/349 |
| 7,310,336 B2 * | 12/2007 | Malkamaki | 370/392 |

FOREIGN PATENT DOCUMENTS

| | | |
|---|---|---|
| EP | 726 685 | 8/1996 |
| WO | 99/26364 | 5/1999 |
| WO | 00/05911 | 2/2000 |
| WO | 01/41349 | 6/2001 |

OTHER PUBLICATIONS

S. Bakhtiyari et al., "Practical Implementation of a Mobile Data Link Protocol with a Type II Hybrid ARQ Scheme and Code Combining", IEEE May 18-20, 1993, pp. 774-777.

S. Aikawa et al. "Forward Error Correction Schemes for Wireless ATM Systems", IEEE Jun. 23-27, 1996, pp. 454-458.

* cited by examiner

S*: Sequential Bit

METHOD FOR TRANSMITTING PACKET INFORMATION IN A RADIO COMMUNICATION SYSTEM

CROSS REFERENCE TO RELATED APPLICATIONS

This application is based on and hereby claims priority to German Application No. 100 076 02.5 filed on Feb. 18, 2000, the contents of which are hereby incorporated by reference.

BACKGROUND OF THE INVENTION

1. Field of the Invention

The invention relates to a method for transmitting packet data in a radio communication system and a radio communication system, in particular a mobile radio system, for carrying out the method.

2. Description of the Related Art

In a radio communication system, messages and data, for example voice, image information or other data, are transmitted via a radio interface by electromagnetic waves. The electromagnetic waves are emitted here with carrier frequencies which lie in the frequency band which is provided for the respective system. A connection is set up via a radio interface between at least one base station and a plurality of subscriber stations which may be mobile or fixed radio devices and which are the lowest elements of the system. A base station supplies the radio network over a region which is up to several square kilometers in size and referred to as a radio cell. The spatial delimitation of a radio zone which can be achieved in this way enables the scarce carrier frequencies to be reused at a certain distance at the same time without the channels interfering with one another. For this purpose, a plurality of radio cells form a cluster which is administered jointly by a base control station. A plurality of base control stations in turn are connected via a mobile switching device via which the access to the fixed network or further mobile radio systems is carried out.

In order to provide better coverage of the demand for available spectrum space in the scarce "carrier frequency" resource, synchronous multiplex methods on the basis of a frequency-selective, time-selective or spread-code selective multiple access method for distributing the transmission capacity of a channel between a plurality of connections have been introduced. For this purpose, a predefined pattern made up of transmission-synchronous and reception-synchronous frequency bands, time slots or code sequences is used in agreement between the transmitter and receiver, including possible switching nodes. The transmitters assign the data of the individual connections to this pattern, and the receivers separate the data determined for them from the received data stream.

A further basic method is packet switching. It is based on the common use of a transmission channel with a high transmission capacity by a plurality of different connections. The transmission channel on the time axis is also divided up for this method, however not into fixed time slots but rather into addressed data packets of variable length, it being possible to transmit simultaneously even a plurality of data packets by additional separation in code or frequency. The data is transmitted variably with respect to time, for which reason the term asynchronous multiplex method can also be used. Each transmitter can access at any time the transmission capacity unused until then, and can transmit its data using, for example, the ALOHA method, a stochastic access method. In addition, the data rate of a connection can be varied in a very flexible way. The transmitter can influence the data rate both in terms of the time intervals at which it transmits the data packets and in terms of the length, and the number of codes or frequencies used.

Future mobile radio systems such as the UMTS (Universal Mobile Telecommunications System) will provide network subscribers with a multiplicity of different services with different bit rates. In addition to the pure transmission of voice, multimedia applications with the associated variety of services will make up a large part of the data volume. The transmission of packet data in a way which is variable over time on the radio interface, permitting very flexible access in the time slot pattern or code pattern which is predefined by the synchronous time-division multiplex component of UMTS, is particularly promising here. At the same time, stations wishing to transmit may start to transmit at specific synchronous points in time when transmitting in the uplink direction using what is referred to as the "slotted ALOHA" method. In the downlink direction, the distribution of resources is performed by the base station.

Large data packets cannot be transmitted in one piece. For this reason, before the actual transmission, they are once more divided up into small data units, referred to as PDUs (Protocol Data Units). Each PDU contains user data and is—generally—provided with a header which contains the associated receiver address and sender address, the serial number of the PDU and possibly further information necessary for the transportation of the PDU. In the case of packets in the field of mobile radio, the receiver address and sender address is typically not always present in each header. The serial number or sequence number is an identification number for directly identifying a specific PDU. At the end of the user data, a checksum, which is calculated by an error-detecting code (CRC=Cyclical Redundancy Check Code) relating to the user data bit, is added for the detection of errors which arise on the transmission link. Known headers and CRCs have a constant length. In the case of UMTS, RLC-PDUs have a header which can be prolonged—signaled by a marker (flag)—by a header extension. If the length of the PDUs is constant, the end of the PDU is defined at the same time as the start of the PDU. On the other hand, if the length of the PDU is variable, the length of the PDU is specifically stated in the header or the end of the PDU is identified, in precisely the same way as the start of the PDU, by an additional marking (flag) on a link layer.

The entire PDU, composed of header, user data and CRC, is additionally channel-coded before transmission in order to increase the error protection on the transmission link. More redundancy is introduced into the system by various code algorithms. An additional error protection against drops in level is also achieved by bit interleaving. Here, the PDU which has already been channel-coded, referred to as CPDU (Coded Protocol Data Unit) is either distributed in chronological succession, simultaneously or partially simultaneously or successively. The CPDUs are then transmitted via the radio link. The abovementioned components of a PDU are distributed here over all the CPDUs by error protection coding and methods in each case.

The mobile radio channel is one of the most unfavorable transmission channels occurring in telecommunications technology. One problem is short-term drops in reception level and signal distortions which are mainly caused by multipath propagation (fast fading) of the radio waves which are reflected or bent at obstacles on the transmission path. The transmission signal reaches the receiver with time offset on paths of different lengths, which, depending on the phase angle of the signals, leads to extinctions or amplifications (interference) at the receiver. In the case of transmission of the abovementioned data structures, it is possible for this to result not only in loss of data, but also with equal probability, in loss of the header. As a result, a PDU can no longer be assigned to a connection.

When data is lost on the transmission path, which loss is noticed by the receiver in the evaluation of the checksum of the CRC, according to the known prior art there is the possibility of immediately repeatedly transmitting one or all of the PDUs of a data packet by a repeat request (ARQ or Automatic Repeat Request) from the receiver. To do this, the transmitter administers a copy of the transmitted PDU or PDUs of a data packet until it has received a reception confirmation for the respective data unit. The receiver for its part requires a sufficiently large memory to be able to store error-free PDUs until all the PDUs received with an error have been repeated, and the message can be assembled.

The receiver will therefore request a PDU once more by a protocol structure. However, as it is highly probable that the header of the PDU with an error cannot be decoded, and the receiver is thus not able to repeat the correct PDU to the transmitter, there are concepts in which the header is not transmitted with the user data in a traffic channel but rather separately in a control channel, for example during transmission to the FACH (Fast Associated Control Channel) in the downlink, with a relatively high degree of error protection. As this control channel is under certain circumstances not in the same timing configuration as the traffic channel, the control channel requires additional identification signaling in order to be able to discover the subscriber in the system and be able to assign the header to him. Furthermore, this control channel is used simultaneously with a finite capacity of a large number of subscribers in the system, which can lead to overloading of the resource.

In digital radio communication systems it is particularly critical if the identification number or sequence number of a PDU is lost during the transmission. Specifically in ARQ error correction methods with a repeat request by the receiving station, sequence numbers are used to permit the receiver side to request supplementary information for correcting incorrectly transmitted PDUs. In what is referred to as the "Hybrid-ARQ I", the receiver end informs the transmitting station, which may be in particular a transmitter, directly or indirectly of the unsuccessfully transmitted sequence numbers or the sequence numbers of the unsuccessfully decoded PDUs, which are then sent once more by the transmitting station.

In other error correction methods such as what is referred to as the "Hybrid-ARQ II" method and what is referred to as the "Hybrid-ARQ III" method, an incorrectly received PDU (first coding unit) is linked to a supplementary item of information (second, third, . . . , n-th coding unit) which is subsequently transmitted by the receiver, in order to restore the PDU. The term "coding units" refers below in this context to the data sets, in particular information sets or redundancy sets which are generated from data packets and which permit the data packets or PDUs to be restored at the receiver end either individually or by suitable linking. It is possible to send once more coding units which have already been dispatched or sent and to combine them with the already transmitted version by combination in the best possible ratio (maximum ratio combining). For example, in ARQ II/III methods, coding polynomials can be used, in which what are referred to as "rate matching" measures are not excluded. For this reason, it will be ensured in ARQ II/III methods or comparable methods that the sequence number of the receiver is also reliably recognized as being error-free or having an error when the PDU itself is faulty. Furthermore, the transmission protection of an individually transmitting sequence number will be of appropriate quality in comparison with the quality of the transmission protection of the data. Here, under certain circumstances, it will also be possible to take into account the gain in multiple transmission with increasing coding depth of the data.

In Hybrid-ARQ II/III methods or comparable methods it is therefore currently necessary for the coding units which are transmitted in with an error to be stored in the receiver in order to be linked to the following corresponding coding units. The assignment of these two coding units, or of a plurality of respectively associated coding units, can be carried out using the sequence number. As a result of the subsequent dispatching, the sequence of the dispatched sequence numbers is not fixed from the outset. In particular, as a result the sequence numbers do not necessarily increase monotonously. The sequence numbers of the incoming PDUs are therefore explicitly communicated to the receiver. For Hybrid-ARQ II/III or comparable methods it is therefore desirable for the sequence number also to arrive correctly at the receiver with a high degree of probability even if the associated PDU data is faulty. Problems may result in particular if the sequence number is dispatched together with the PDU: the correctness of transmitted data can be checked by reference to a CRC sent with the data. If the CRC also refers to the sequence number, a positive CRC check result confirms the correctness of PDU and sequence number, while a negative output of the CRC check result indicates an error in the PDU or in the associated sequence number or header with the sequence number. Given a negative CRC check result it is thus unclear whether the sequence number or the header with the sequence number has been correctly or incorrectly received or decoded. If the receiver knows the sequence number of a faulty PDU, it can be specifically requested. As the knowledge of the sequence number of faulty PDUs for Hybrid-ARQ II/III methods or comparable methods is therefore necessary to request a repeat transmission, it is necessary to select a form of the transmission of the sequence numbers in which the sequence numbers are transmitted reliably enough and in which the correctness of the sequence numbers can be determined by CRC check methods independently of the correctness of the transmitted PDUs.

In Hybrid-ARQ II/III methods or comparable methods, it is also necessary to signal successfully to the receiver whether the coding unit which is possibly transmitted in a disrupted fashion is the first, second, third, . . . or n-th coding unit. The correctness of the transmitted coding unit number (1, 2, 3, . . . or n) cannot be checked together with the data by a CRC. The correctness of the received coding unit number must also be capable of being checked when the transmission of PDU data is disrupted.

Hitherto, there have been the following approaches for solving the problems formulated above:

A) For Hybrid ARQ I, the simplest possibility is for the receiver end to send the sender or transmitter just one status message relating to the successfully received PDUs. The sender can read directly from this which of the dispatched PDUs has not been successfully received by the receiver. It is necessary to ensure here that the PDUs which have not been confirmed would have had to have already arrived at the receiver at the dispatching time of the status message, and have consequently clearly been received faultily so that renewed transmission is appropriate. A reliable reception of the sequence numbers of disrupted PDUs would significantly simplify the ARQ I method and would have the advantage that in the case of a disruption of the transmission channel the receiver can request re-dispatching of the disrupted PDUs explicitly without an unnecessary loss of time.

For ARQ I/III methods or comparable methods, a transmission of the sequence numbers which is improved with respect to the data is absolutely necessary as during the decoding it must be ensured that the coding units which are combined for this purpose are associated with the same PDU.

B) In future mobile radio systems, for example UMTS (Universal Mobile Telecommunications System) systems, it would in principle be possible, when making a UDD (Unconstrained Delay Data bearer service) downlink transmission, i.e. when connecting in the downlink direction from a hierarchically superordinate station to a subordinate station, to use in the reply mode ("acknowledged mode"), the FACH for reliable transmission of the sequence number and, if appropriate, of the coding unit number (for example coding unit number: first, second or n-th transmission). Data in the FACH are as a rule better protected than the data in the traffic data channel (TCH) as a result of better coding, and in the case of the TDD (Time Division Duplex) method by interleaving over two frames and by virtue of maximum transmission power. The transmission of the sequence numbers using the FACH has, however, the disadvantage that large FACH capacities have to be made available for it. Unused FACH capacities are resources which are wasted in systems with what are referred to as hard blocking. Owing to the high transmission power of FACHs, unnecessarily high interference is additionally generated.

The transmission of the sequence number in the traffic channel may provide the possibility of each user individually regulating the power for the transmission path. In addition, in contrast to an omnidirectional FACH, the use of direction-dependent emissions in the direction of the receiver unit can improve the capacity utilization of the system.

SUMMARY OF THE INVENTION

The invention is therefore based on the object of improving the error protection for the identification information, in particular identifying numbers of packets, in the transmission on the radio interface.

Transmitting the identification information separately from the data packet assigned to it increases the certainty of complete and correct transmission. In particular, in the case of transmission errors, the problem of not being able to detect whether the identification information or the actual data is incorrect no longer exists.

A user-specific connection is ensured by the fact that the identification information of the data packet assigned to it is transmitted separately in a channel specially set up for transmitting the identification information (PDU-No.).

The PDU number of a data packet/PDU and, if appropriate, a coding unit identification of the data packet are advantageously transmitted as identification information. This information is clear and concise data which can be separated without difficulty from the other data of a data block and transmitted without difficulty. There is alternatively also the possibility of transmitting further header information or the entire header information separately from the data-data packet.

Transmitting the identification information in a data packet other than the data packet assigned to it has the advantage that it is possible to use conventional data packets for the transmission.

The identification information is advantageously multiplied and transmitted distributed between a plurality of headers of the data packet which is in particular separate and different than the data packet assigned to it so that a high degree of redundancy is made possible.

Distributing the identification information between directly successive data packets also permits only a portion of the identification information to be transmitted in a portion of the data packets or their headers.

Distributing the identification information of data packets within a sequence of a multiplicity of data packets between more data packets or their headers than in the case of the identification information of one or more first or last data packets of the sequence of data packets permits continuous changing and restarting of transmission cycles. In data packets in the edge region of a sequence of data packets, replacing the identification information from other data packets or their headers, at least partially, with particularly specified replacement information simplifies this.

If there is still uncertainty about an item of identification information of specific data packets at the time provided for the transmission of precisely this item of identification information, this can in particular also be indicated by a special flag.

One advantageous error checking method checks, after an error and after further transmission has taken place, in particular by CRC, the new header and the reconstructed data packet from the first and second coding unit.

The identification information for a current data packet can advantageously be transferred from one or more data packets which have previously been determined in particular as having been correctly received, with this identification information as supplementary information, which simplifies the determination of the identification information and the error checking of it and of the data.

An additional indicator information, in particular an export/import indicator bit, forms an indication of data packet identification information which is distributed over a plurality of data packets. If there is an absence of further identification information, it is possible to dispense with a correspondingly time-consuming search for the information.

Transmitting a plurality of assigned data-data packets with partially common identification information relating to various user-group-specific transmission channels or transmission paths permits not only secure connections but also the simple setting up of conference connections.

The sequence numbers are advantageously transmitted more reliably owing to the relatively high redundancy.

If the repetition of a sequence number is located in the header of a non-disrupted PDU with positive CRC check, the correctness of the sequence number can be ensured even when there is a negative CRC check.

In Hybrid ARQ I methods, the receiver can receive the sequence number of a disrupted PDU and can independently and explicitly request its re-dispatch.

Hybrid ARQ II/III methods or comparable methods are dependent on correct and checkable reception of the sequence numbers of disrupted PDUs. The method constitutes an "inband signaling" method that can be used for Hybrid-ARQ II/III.

The distribution of the sequence number among further headers increases even more the redundancy and thus the probability of detection of the sequence number.

The sequence number is known before the decoding of the current data. For this reason it is possible to ensure that the correct coding units are linked to one another in Hybrid-ARQ II/III methods.

In successful CRC checks, the distributed sequence numbers can be used for additional consistency checks.

Transmitting the identification information of a multiplicity of data packets in a separate information data packet is particularly advantageous according to one embodiment with independent inventive significance as this permits efficient and easily controllable transmission of the information data. In particular, with respect to the information data, only a single specific data block has to be particularly reliably transmitted with it. Transmitting, in terms of the basic structure, a conventional data packet with a customary header as the information data packet permits the existing methods and devices in radio communication systems to be used without their costly reconfiguration.

Additionally higher coding may be desirable in order to protect the important header information better than the data.

Transmitting the data-data packets in the same sequence in which their assigned identification information is arranged in the information data packet permits particularly rapid processing and assignment at the receiver. In addition, at best, the information region in the header of the data-data transmission block can be used for information other than the data packet number. Furthermore, only low storage capacities are required at the receiver, in particular if the identification information is respectively transmitted before the assigned data packet.

As a result of the transfer of the numbers of the code units, the transmission can also be carried out in accordance with a proven Hybrid-ARQ method or comparable methods. Advantages are also obtained for the Hybrid-ARQ I method from a reliable transmission of sequence numbers which are independent of disruption to the PDU data. The receiver can then request incorrectly received PDU numbers explicitly and without time loss.

Acknowledging the reception of at least one item of identification information by a confirmation response in the opposite transmission direction provides an even further improved degree of reliability and at the same time permits rapid release of storage resources.

Transmitting the identification information repeatedly in the case of an error containing or delayed transmission is particularly appropriate as in this way transmission errors owing to instantaneous local or chronological disruptions of the transmission path can be compensated for. Transmitting a repeat item of information at least in the case of a repeated item of identification information increases the reliability of being able to avoid incorrect assignments. In the case of an excessively large sequence of incorrect transmissions, an automatic error report can also be output or the transmission can be temporarily or definitively aborted.

Buffering data-data packets received before an assigned item of identification information until the reception of the assigned identification information makes it possible to hold at the receiver data packets which have been transmitted over relatively short or relatively fast data paths until all the previously necessary data packets have arrived there.

Transmitting only a portion of the actual identification information of the assigned data-data packet as the identification information, for example only the last bit of the number, permits at least an estimation to be made of the correctness of a data transmission which has taken place. Transmitting the identification information in a compressed form of the actual identification information of one or more assigned data-data packets permits, for example, only the first and the last data packet number of a series of successive numbers, or a start number and a increment of following numbers, to be specified.

The coding of the identification information before the transmission increases both the reliability of the transmission and the possibility of being able to reconstruct specific errors without retransmissions.

Transmitting the identification information and assigned data-data packets via various transmission channels or transmission paths permits, for example, the identification information to be transmitted via particularly secure data channels or channel types.

In particular, sequence numbers and coding unit numbers can be coded sufficiently powerfully independently of the user data. Sequence numbers and coding unit numbers advantageously have a separate CRC with which their correctness can be checked separately from the user data.

Given disrupted transmission of the sequence numbers and coding unit numbers, they can be transmitted once more without the associated PDUs having to be redispatched. The latter leads to relieving of the load on the transmission resources of the system.

The user data can be dispatched immediately after the identification information PDU or Index-PDU. If an Index-PDU is disrupted and has to be re-sent, the subsequent reassignment of the sequence number and optionally coding unit number and coding unit is carried out both for coding units which have been decoded successfully and for those which have not been decoded successfully.

The PDU number can additionally be transmitted in the header of the associated data-PDU. In this way, it is possible to check, through comparison, that the receiver has received the correct PDU.

For Hybrid ARQ II/III methods or comparable methods, the checkable correctness of the transmitted sequence numbers of disrupted PDUs is important. The method presented above provides advantages here both for the combination of different coder units and for "maximum ratio combining". Large advantages in the retransmission administration are obtained for Hybrid ARQ I.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
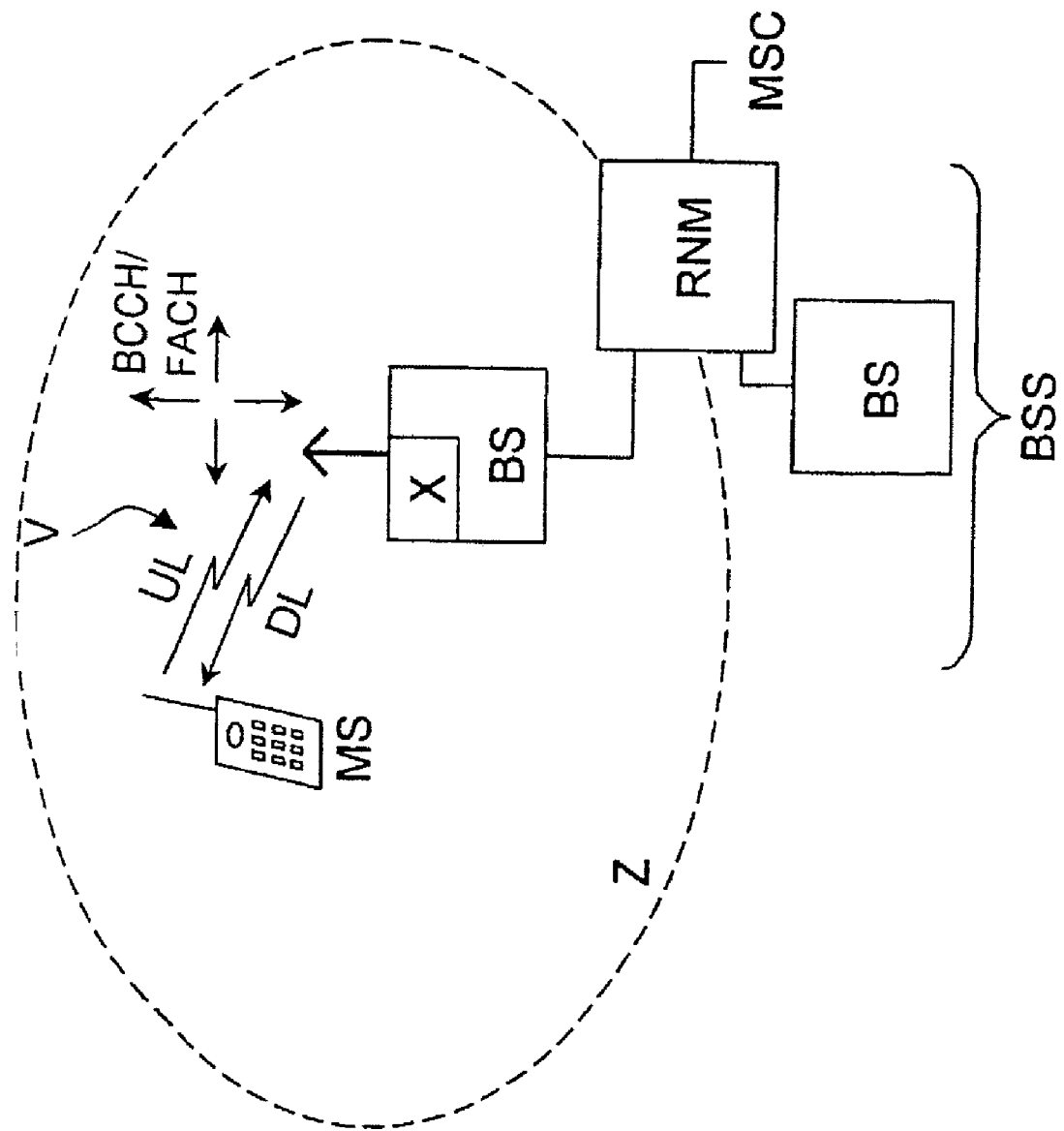
FIG. 1 is a block diagram of a simple form of a radio interface between two communicating stations, FIG. 2 contains data diagrams of the structure of three PDUs with, in each case in the header, the sequence number of its own and of the directly following PDU, FIG. 3 contains data diagrams of the structure of three PDUs with, in each case in the header, the sequence number of its own and of the directly following PDU as well as various CRCs for various coding units, FIG. 4 contains data diagrams of the structure of three PDUs with, in each case in the header, the sequence number of its own and of the directly following PDU as well as additional CRC for the header, FIG. 5 contains data diagrams of the structure of three PDUs with, in each case in the header, the sequence number of its own and of the directly following PDU and an additional sequential bit for indicating specific following sequence numbers, FIG. 6 contains data diagrams of the structure of three PDUs with, in each case in the header, the sequence number of its own, of the directly preceding and of the directly following PDU.

Reference will now be made in detail to the preferred embodiments of the present invention, examples of which are illustrated in the accompanying drawings, wherein like reference numerals refer to like elements throughout.

The mobile radio system illustrated in FIG. 1 as an example of a known radio communication system composed of a multiplicity of network elements, in particular of mobile switching centers MSC, devices RNM for allocating radio equipment resources, base stations BS and subscriber stations MS in the lowest hierarchy level.

The mobile switching centers MSC which are networked to one another and of which only one is illustrated here, set up the access to a fixed network or to another radio network. In addition, these mobile switching centers MSC are connected to in each case at least one device RNM for allocating radio equipment resources. Each of these devices RNM permits in turn a connection to at least one base station BS. Such a base station BS can set up, via a radio interface, a connection to subscriber stations, for example mobile stations MS or other mobile and fixed terminals. At least one radio cell Z is formed by each base station BS. A plurality of radio cells Z are also supplied per base station BS in the case of sectorizing or when there are hierarchical cell structures.

FIG. 1 illustrates, by way of example, existing connections V and UL, DL for transmitting user information and signaling information between a mobile station MS and a base station BS. Furthermore, an organization channel (FACH or BCCH: Broadcast Control Channel) is illustrated which is made available for the transmission of user information and signaling information with a defined transmission power of each of the base stations BS for all the mobile stations MS in the region of the radio cell Z.

In order to improve the transmission reliability for the numbers of the PDUs, an additional item of identification information is introduced here. This identification information is preferably composed of an additional repetition of the sequence number or, in particular for Hybrid-ARQ II/III methods or comparable methods, of the coding unit number in another PDU, as is explained with reference to the following exemplary embodiments and forms.

The PDU header is transmitted together with the PDU in the transport channel, which is also referred to as "inband signaling". The header contains not only the sequence number of this PDU in which it is located but also information relating to one or more sequence numbers from one or more other PDUs.

Figure 2:
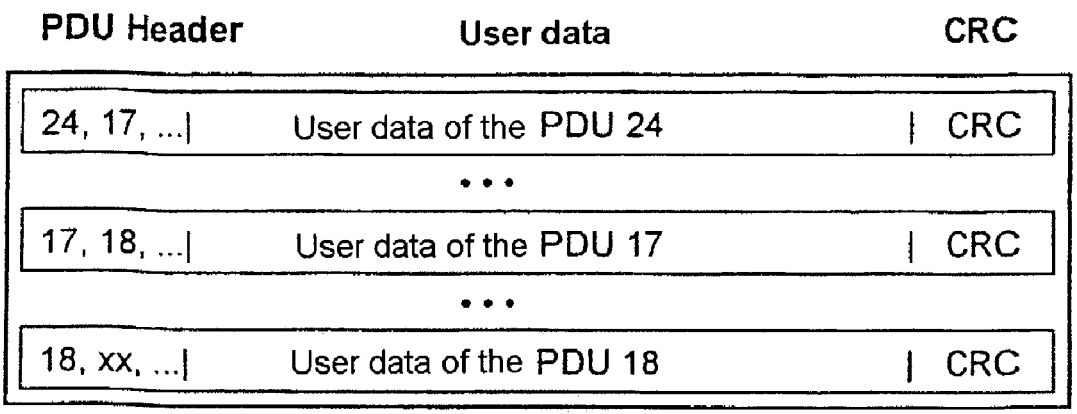

According to a first exemplary embodiment outlined in FIG. 2, the header in a PDU has the sequence number of that PDU and the sequence number of the directly following PDU. The sequence number of a header is therefore copied and distributed between a plurality of headers, for example transmitted to the next header.

In FIG. 2, the header of the first PDU to be transmitted with the PDU number 24 contains at least the sequence numbers 24 and 17. The header is followed by the section with the actual user data of the PDU 24. The user data section of the PDU is advantageously followed by a CRC section which permits receiver-side error checking.

The second illustrated PDU has the PDU number 17. The transmission of this PDU 17 is carried out in this example directly after the previously represented PDU 24. The header of the PDU 17 contains its own sequence number 17 and at least one further sequence number, 18 here. The header is correspondingly followed by the section with the actual user data of the PDU 17 and a CRC section.

The third represented PDU has the PDU number 18. The transmission of this PDU 18 is carried out in this example directly after the previously represented PDU 17. The header of the PDU 18 contains its own sequence number 18 and at least one further sequence number. "xx" is entered here as a further sequence number, representing a defined bit pattern which is then entered if the sequence number of the following PDUs is known. The header is correspondingly followed by the section with the actual user data of the PDU 18 and a CRC section.

In the last PDU, i.e. if all the queues on the transmitter side are empty or if it is unclear which sequence number is transmitted next, a defined bit pattern "xx" can advantageously be transmitted. The sequence number corresponding to the bit pattern can then optionally be excluded from the method proposed here for the distributed repetition of PDU sequence numbers (DROPS—Distributed Repetition Of PDU Sequence numbers).

If, according to an expanded embodiment, it is ensured that two PDUs with the same sequence number are never sent in succession in the system, the current PDU sequence number can be repeated in the header if the sequence number of the following PDU is not known. Alternatively, an additional bit could indicate the uncertainty about the following sequence number. With the proposed method each sequence number—with the exception of the first—is dispatched twice, resulting in a gain in redundancy. An additional check for a CRC method is not necessarily required in each PDU. If the checking CRC method of a PDU results in an error containing transmission, the sequence number which has the disrupted PDU is taken from the preceding, successfully received PDU. The sequence number of the second PDU can no longer be determined only if two successive PDUs are disrupted.

It is to be expected that the distribution of the redundancy among a plurality of PDUs makes the probability of the transmission of the sequence numbers significantly higher than if the sequence number is sent with the same redundancy in the same PDU. The reason for this is the lower correlation between the bit errors for separately sent data.

Figure 3:
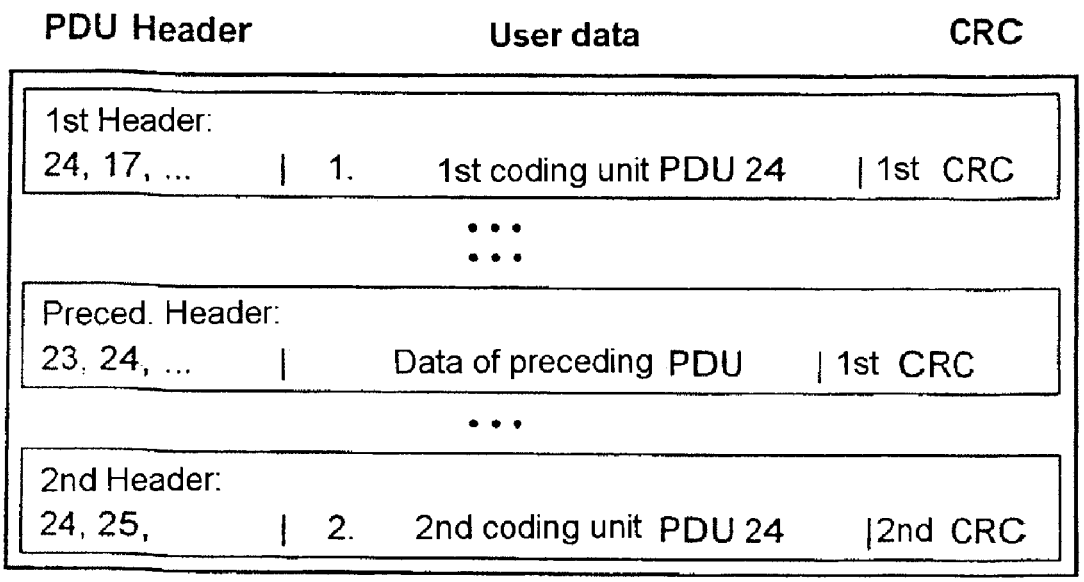

A second exemplary embodiment with a representation in FIG. 3 solves an additional problem which occurs in Hybrid-ARQ II methods. In the method of the first exemplary embodiment (FIG. 1), the header of a retransmission generally differs from the header of the first transmission. If the header of the first transmission was defective, it cannot be directly corrected by the header of the second transmission by "soft combining" or similar methods.

The problem can be solved by specific use of the CRCs of the various PDUs as follows: the CRC in a first transmission, the transmission of the first coding unit of PDU 24 in FIG. 3, checks the correctness of the first received header and of the reconstruction of the PDU 24 from the first coding unit.

If the checking CRC method is negative, the coding unit is stored under the sequence number which is taken from the header of the preceding PDU.

The transmission of the second coding unit which then takes place contains a CRC which checks the correctness of the second header and the reconstruction of the PDU 24 from the first and the second coding unit. If the CRC check is positive, the receiver has certainty about the received PDU data and the sequence number. If the CRC check is negative, the receiver takes the sequence number from the header of the preceding PDU, stores the coding unit under this sequence number and requests a further retransmission.

Alternatively, the receiver can attempt to replace the sequence numbers in the header with the information from the adjacent PDU headers, and can then apply the CRC check again to the corrected header and the two coding units, which actually belong together according to the corrected sequence number.

In a first check step, the first CRC checks the first header and the first coding unit. In a second check step, the second CRC checks the second header and a combination of the first and second coding unit.

Figure 4:
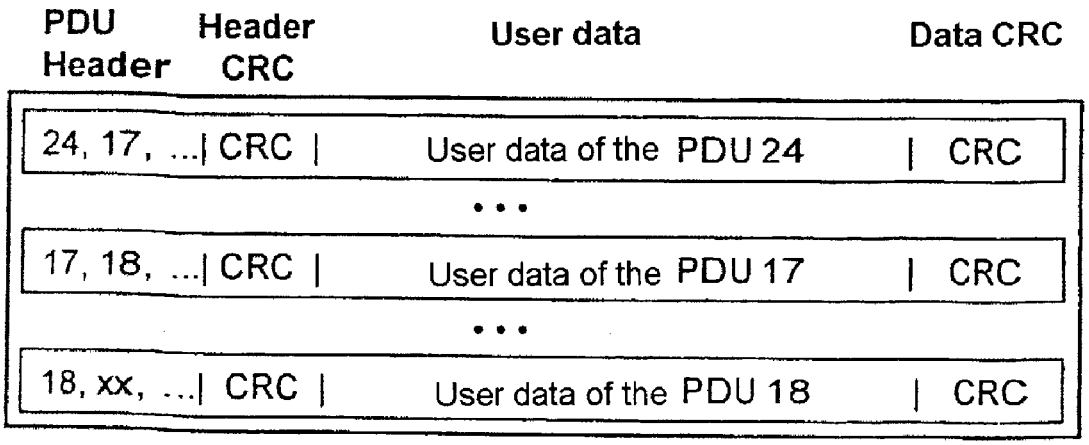

The third exemplary embodiment outlined in FIG. 4 shows an alternative method to the second exemplary embodiment, for applying the procedure from the first exemplary embodiment to Hybrid-ARQ II/III systems. Here, two CRCs, namely a header CRC for the header and a data CRC for the PDU data are used. Here, the header CRC is used to check the header, while the data CRC only checks the correctness of the PDU user data determined by decoding. The data CRCs in the first and second coding units relate to the same PDU data and are thus identical. Dispatching the CRCs a second time enables possible errors in the CRC of the first transmission, for example due to what is referred to as "maximum ratio combining", to be corrected.

The use of two CRCs increases the probability that the correctness of the header of a PDU is successfully confirmed by a positive CRC check as the CRC check of the header is carried out independently of errors in the generally significantly longer data region. However, the number of useful bits available per PDU drops by the quantity of bits which is required for the second CRC.

Figure 5:
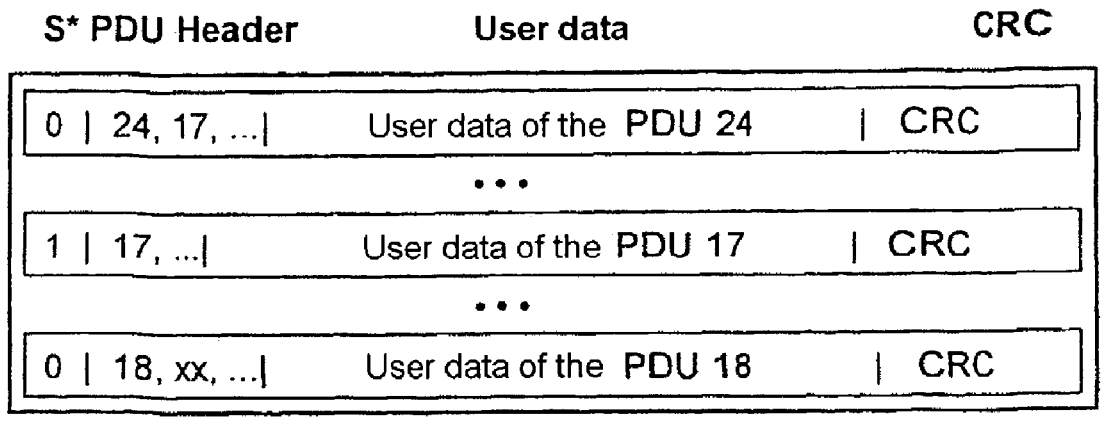

The concept of a fourth exemplary embodiment, with respect to which three PDUs are outlined in FIG. 5, adds a header compression method to the first three exemplary embodiments. For this purpose, a sequential bit is inserted in the header, where the sequential bit indicates whether the following sequence number is 1 greater than the current sequence number (sequential bit=1) or whether this is not the case (sequential bit=0). In the former case, the sequence number of the following PDU is not explicitly transmitted in the header. The size of the header is reduced for a large number of applications. The gain in resources can be used, for example, for lower puncturing of the user data.

Figure 6:
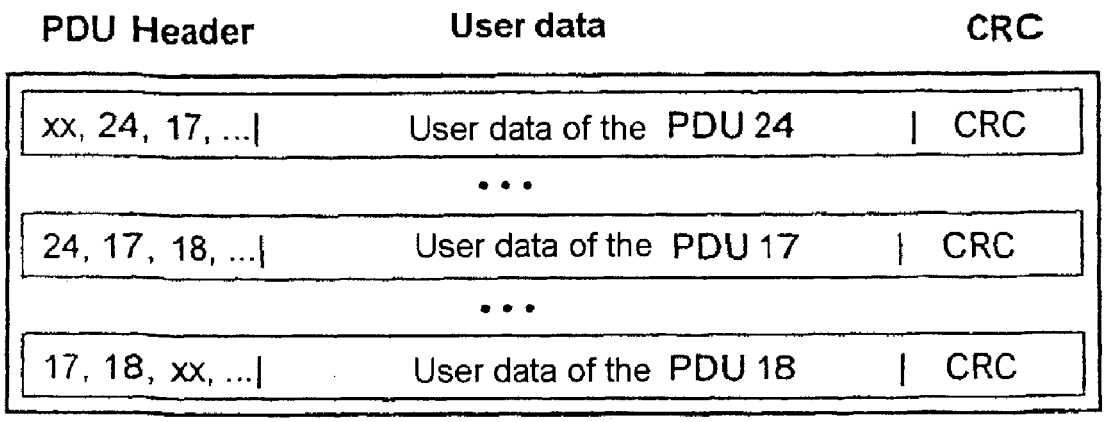

According to a fifth exemplary embodiment, with respect to which three PDUs are illustrated in FIG. 6, it is proposed, as a supplement to the exemplary embodiments described above, to transmit not only the sequence number of the current PDU and the sequence number of the following PDU, but also the sequence number of the preceding PDU. This leads to further increased redundancy.

Whereas, in the first exemplary embodiment, a corresponding bit pattern was used to take into account the fact that no information relating to a following sequence number is present after, for example, a last PDU to be transmitted, here it is appropriately also taken into account that no sequence number of a proceeding PDU is known for the header of the first transmitted PDU. This can be characterized in accordance with the first exemplary embodiment by, for example, a defined bit pattern.

According to a sixth exemplary embodiment, as a supplement to other exemplary embodiments, not only the sequence number of its own PDU but also additionally the sequence numbers or possibly sequential bits for m preceding or n following PDUs are entered in the header. The variables m and n are here integers which are greater than or equal to 0, which should be defined at the latest at the start of the service. If sequential bits $s(-m), s(-m+1), \ldots, s(n-1), s(n)$ are used, so) will be set to 1 in a PDU with the sequence number k if the PDU has a sequence number k+j at the interval j. The redundancy of the sequence number rises in proportion with m+n.

According to a seventh exemplary embodiment, in a modification of the other exemplary embodiments, the PDU which are interlinked by the sequence numbers do not need to be adjacent. This means that the header contains sequence numbers $s(-m), \ldots, s(n)$ which relate to the PDUs at intervals $d(-m), \ldots, d(n)$. The first exemplary embodiment could thus be, for example, modified in such a way that the header contains its own sequence number and the sequence number of the following PDU which is k PDUs away. The gain which is achieved by interleaving is thus increased by the relatively large time interval between the PDUs.

According to an eighth exemplary embodiment, in a modification of the other exemplary embodiments, the distributed repetition of the sequence numbers is replaced by other redundancy information.

According to a ninth exemplary embodiment, in a modification of the other exemplary embodiments, given a successful CRC checking method of a PDU, the sequence numbers of following PDUs which are located in the header are used as valid sequence numbers of the following PDUs. This has the advantage that for these following PDUs, the sequence number which the PDU has is already reliably known even before decoding and CRC check. This is particularly advantageous in ARQ II methods because it avoids a coding unit being combined with an incorrect coding unit.

According to a tenth exemplary embodiment, in a modification of the other exemplary embodiments, a comparison of the multiply transmitted sequence numbers is used as a consistency check which improves even more the error detection rate which is provided by checking the CRC method.

According to an eleventh exemplary embodiment, the other exemplary embodiment are expanded with the possibility of the information/redundancy which is distributed over a plurality of PDUs being combined to form the sequence number/coding unit number in order to achieve a higher probability of detection of the sequence number/coding unit number. For example, a hard-combining or soft-combining method can be carried out between two or more sequence number replicas which have been transmitted in different headers.

As another possibility, various coding words can be formed from the sequence number/coding unit number of a PDU, which words are then used for decoding individually or in combination in a way similar to the Hybrid-ARQ II/III method. The detection of the desired information is promoted here by interleaving effects.

According to a twelfth exemplary embodiment, the header additionally contains, in a modification of the other exemplary embodiments, one or more export indicator bits which indicate whether the sequence number/coding unit number information has been "exported" into other PDUs, i.e. whether this redundancy is actually located in the headers of the PDUs which are provided for the redundancy transmission of the sequence number/coding unit number. In this way it is possible to decide very flexibly, from PDU to PDU, whether or not the sequence number/coding unit number is distributed among other PDUs.

According to a thirteenth exemplary embodiment, the header additionally contains, in a modification of the other exemplary embodiments, one or more import indicator bits which indicate which redundancy/information is located in the header of the current PDU which can be used to reconstruct the sequence number/coding unit number of other PDUs. This proposal also contributes to the fact that it is possible to decide very flexibly, from PDU to PDU, whether or not the sequence number/coding unit number is distributed among other PDUs.

In the exemplary embodiments above, only the information/redundancy with respect to the sequence number, and optionally with respect to the coding unit number, is distributed among other PDU headers. For this purpose, it is also additionally or alternatively possible to generate the information/redundancy in accordance with a fourteenth exemplary embodiment for the entire header or for specific parts of the header of a PDU and to attach this information/redundancy to the headers of other PDUs.

According to a fifteenth exemplary embodiment with independent inventive significance, an additional PDU, referred to below as Index-PDU, is introduced in order to improve the reliability of transmission for the transmission of the numbers of the PDUs.

The information-bearing PDUs, referred to below as RLC-PDUs, which are to be transmitted in a transmission in the reply mode (acknowledged mode) are combined in groups of n PDUs. For each group of n PDUs, and Index-PDU is created in which the sequence numbers of these n PDUs are transmitted. This Index-PDU is transmitted from the base station BS to the communicating mobile station MS separately by the n PDUs. Like any other PDU, the Index-PDU can also be provided with a header.

It is appropriate, but not necessary, for the Index-PDU to be transmitted first here before the associated n PDUs so that the associated sequence numbers are already known at the receiver end when the PDUs are received. As a result, it is also possible in particular to dispense with numbering of the individual following PDU headers.

For Hybrid-ARQ II/III or comparable methods, not only the sequence numbers but also the coding unit numbers are transmitted in the Index-PDU.

For this purpose, when the PDU coding units are transmitted and received, it is advantageously also ensured that their sequence is maintained.

The successful reception of the Index-PDU should be acknowledged by a confirmation response ACK/NACK ("ACKnowledged"/"Not ACKnowledged"). If the transmitter receives a NACK response for the Index-PDU, it transmits it once more. Here, there should be marking in the Index-PDU by a repeat marker or a retransmission flag in order to signal that the transmission is a repeat transmission (retransmission) of an Index-PDU.

The transmitter can advantageously already begin transmitting PDUs before it has received the ACK/NACK for the Index-PDU. If the Index-PDU has not been successfully received, the receiver must nevertheless not discard the subsequently arriving PDUs if the receiver has buffered them in a buffer.

The PDU number can also additionally be transmitted in the header of the associated data-PDU as has been customary hitherto. This is useful if it is possible for the receiver to receive an incorrect PDU. In the case of UMTS systems it is possible for a plurality of services to transmit over the same DSCH channel. Which resources are associated with which service in the current transmission interval is then signaled to the receiver using a TFCI. A TFCI which is transmitted in a disrupted fashion can then possibly lead to a situation in which a user takes the PDUs from the incorrect resources without noticing. If the sequence number of a PDU is transmitted not only in the Index-PDU but also in the header of the respective data-PDU, it is possible to check whether the correct PDU has been received by the receiver by comparing the separately transmitted sequence number information.

In order to save data capacity, it is alternatively also possible to transmit only the, for example, least significant bits of the sequence number in the header of the PDU.

The PDU numbers and the coding unit numbers can also be given in compressed form in the Index-PDU. For example, it is possible to communicate in a compact form that the first of the following PDUs has the index number 17, and the index numbers of the following 40 PDUs increase continuously by 1 from PDU to PDU, in which case, for example, the first coding unit is always sent.

The sequence numbers (and if appropriate the coding unit numbers) can be coded together with sufficient reliability in the Index-PDU without unnecessary overheads being incurred.

For the Hybrid-ARQ II/III or comparable methods, the combination of different coding units leads to an effectively higher coding. So that the error probability of the Index-PDU does not constitute a degradation of the transmission quality in Hybrid-ARQ II/III, the Index-PDU should be transmitted with correspondingly more powerful coding.

A CRC can be used to check the correctness of the received sequence numbers (and if appropriate of the coding unit numbers) separately from the PDU data in a manner known per se.

The Index-PDU can be transmitted with the normal transmission power of the associated traffic channel. Less disruptive interference is thus produced than when transmitting via the FACH.

Figure 7:
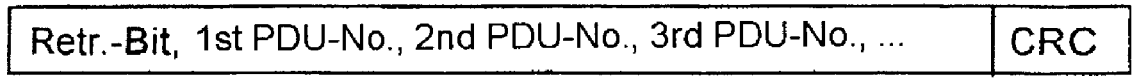
FIG. 7 is a data diagram of the structure of an Index-PDU for a Hybrid-ARQ I method.

As is apparent from FIG. 7, which outlines the structure of an Index-PDU for a Hybrid-ARQ I method, such an Index-PDU starts, for example, with a repetition bit or retransmission bit in order to indicate a first or a repeated transmission. Instead of a single bit, a plurality of bits can also be used, as a result of which barriers can be set which permit an error message or an abortive transmission to be triggered after, for example, 30 unsuccessful transmission attempts.

This is followed by the individual PDU numbers for a multiplicity of data-PDUs whose PDU numbers are listed in this Index-PDU. If the data-PDU are transmitted in the same order as in the list, their own PDU number need not necessarily be contained in them.

Finally, the CR coding CRC takes place, as is already known per se from the data-PDU for error correction.

Figure 8:
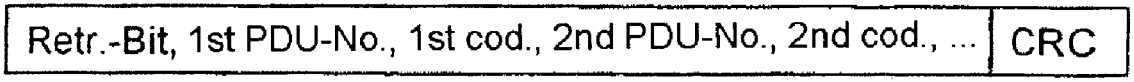
FIG. 8 is a data diagram of the structure of an Index-PDU for a Hybrid-ARQ II/III method, and FIG. 9 contains data diagrams of exemplary PDUs for transmission in the downlink direction.

As is apparent from FIG. 8, which outlines the structure of an Index-PDU for a Hybrid-ARQ II/III method, this structure is comparable to that in FIG. 7. Such an Index-PDU also starts, for example, with a repetition bit or retransmission bit.

This is followed in turn by the individual PDU numbers of a multiplicity of data-PDUs whose PDU numbers are listed in this Index-PDU. However, here, the numbers of the corresponding code units are also transmitted in addition to the PDU numbers. These numbers are also expediently listed arranged alternately with the PDU numbers.

Finally, the CR coding advantageously takes place again.

Figure 9:
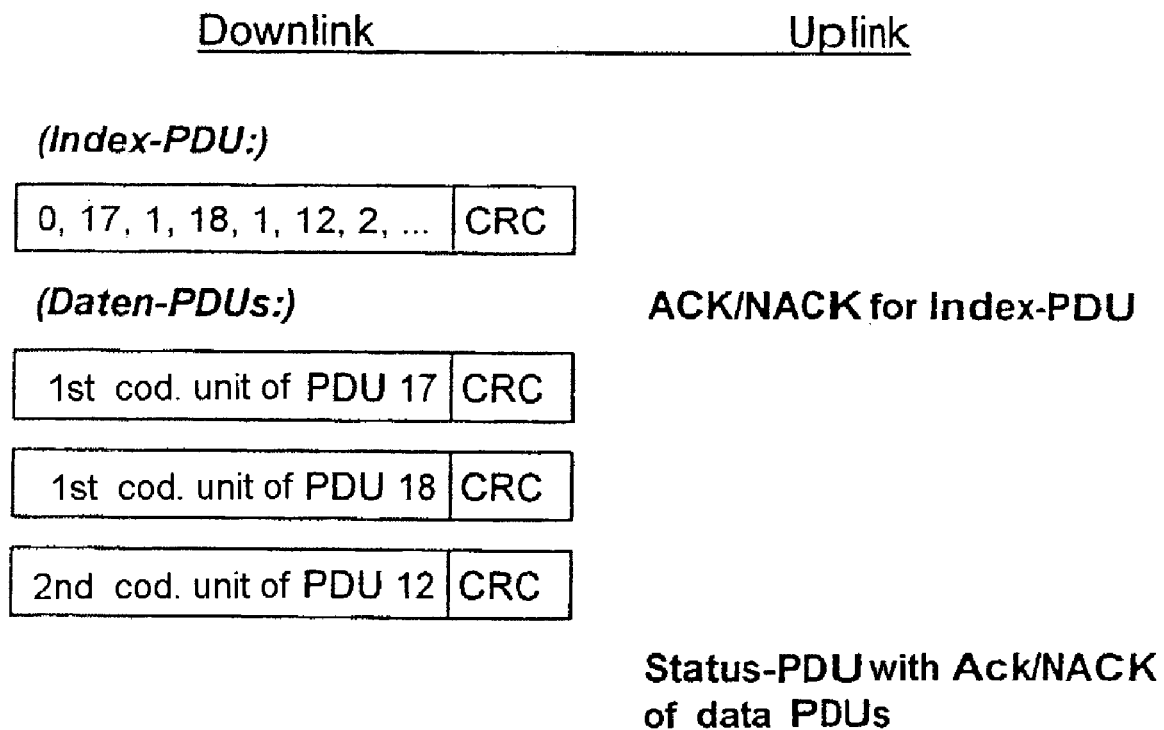

In the sequence illustrated in FIG. 9, alternate transmissions take place in chronological succession. In the left-hand column, transmissions in the downlink from a base station BS to a data terminal, for example subscriber station MS, are represented, and in the right-hand column transmissions in the uplink from the data terminating station MS to the base station BS are illustrated.

Accordingly, firstly, an Index-PDU is transmitted in the downlink, herewith the indication that it is a first transmission and with the numerical values 17, 1, 18, 1, 12, 2 etc.

This is followed by a confirmation ACK/NACK in the downlink, which confirmation could also take place at a later time.

Finally, in the downlink the individual data-PDUs are transmitted, to be precise preferably firstly the data-PDU with the first coding unit of the PDU number 17, followed by the first coding unit of the PDU number 18, followed by the second coding unit of the PDU number 12 etc.

In conclusion, a confirmation or status PDU for the data-PDUs transmitted in the downlink is transmitted in the uplink.

In particular, a special information channel can be used or set up for the transmission of such signaling information for data packets, such a channel being advantageously embodied as a user-group-specific transmission channel.

The invention has been described in detail with particular reference to preferred embodiments thereof and examples, but it will be understood that variations and modifications can be effected within the spirit and scope of the invention.

The invention claimed is:

1. A method for transmitting information via data packets in a packet data transmission via a radio interface of a communication system, comprising:
   transmitting identification information for each data packet between stations communicating with each other, in the same channel or a channel specially set up for transmitting the identification information separately from the data packet assigned thereto;
   wherein said transmitting of the identification information uses the data packet assigned thereto and at least one data packet other than the data packet assigned thereto; and
   the identification information includes at least a number of the data packet assigned thereto.

2. The method as claimed in claim 1, wherein said transmitting of the identification information separately from the data packet assigned thereto uses an immediately following data packet and/or an immediately preceding data packet relative to the data packet assigned thereto.

3. The method as claimed in claim 1, wherein said transmitting transmits the identification information of a multiplicity of data packets in a separate information data packet.

4. The method as claimed in claim 3, further comprising transmitting the data packets in an order defined by an arrangement of the identification information in the information data packet.

5. The method as claimed in claim 4, wherein, during said transmitting, the data packets do not contain identification information assigned thereto.

6. The method as claimed in claim 5, wherein said transmitting of the identification information is repeated in case of at least one of an error and delayed transmission.

7. The method as claimed in claim 6, wherein said transmitting of the identification information in the separate information data packet includes only a portion of the identification information of the data packet assigned thereto.

8. The method as claimed in claim 7, further comprising compressing the identification information in the separate information data packet for at least one assigned data packet.

9. The method as claimed in claim 1, further comprising distributing the identification information within a sequence of the data packets, between more data packets than the identification information of at least one first or last data packet of the sequence of data packets.

10. The method as claimed in claim 9, further comprising at least partially replacing, in the data packets at an edge region of a sequence of data packets, the identification information for other data packets with replacement information.

11. The method as claimed in claim 1, further comprising indicating uncertainty about the identification information of specific data packets by an indicator.

12. The method as claimed in claim 1, further comprising:
   checking headers and reconstructed data of a data packet using an error checking method in a first transmission; and
   processing the reconstructed data in accordance with additional identification information of another data packet if an error is detected in the reconstructed data.

13. The method as claimed in claim 12,
   wherein said checking using the error checking method checks a header and the reconstructed data from a current coding unit and from at least one coding unit sent at least one of earlier and later, and
   wherein said method further comprises:
      requesting retransmission of at least one data packet in which an error is detected, and
      repeating at least part of said transmitting in response to said requesting.

14. The method as claimed in claim 1, further comprising, during a data transmission, transmitting a marker as at least part of the identification information of further data packets, to signal a systematic ordering system in a sequence of successive items of identification information of data packets.

15. The method as claimed in claim 1, further comprising transferring the identification information for a current data packet from at least one previously received data packet as supplementary information.

16. The method as claimed in claim 1, further comprising:
   transmitting additional indicator information to signal an item of the identification information for a data packet, and
   distributing the identification information over a plurality of the data packets.

17. The method as claimed in claim 1, wherein said transmitting transmits the identification information in compressed form for at least one assigned data packet.

18. The method as claimed in claim 1,
   wherein said transmitting transmits the identification information of a data packet in various data packets or headers thereof, and
   wherein said method further comprises decoding the identification information using a plurality of at least one of information and redundancy portions of the identification information in the various data packets or headers, at least one of individually and in combination.

19. The method as claimed in claim 18, further comprising replacing the identification information with at least part of at least one header.

20. The method as claimed in claim 1, further comprising transmitting assigned data packets with partially common identification information over various user-group specific transmission channels or paths.

21. A radio communication system having at least two stations configured to exchange data packets in packet data transmission and identification information for each data packet, each station including a transmitter device comprising:
   at least one device to transmit identification information in the same channel or a channel specially set up for transmitting the identification information separately from a corresponding data packet;
   wherein the identification information is transmitted using the data packet assigned thereto and at least one data packet other than the data packet assigned thereto; and
   the identification information includes at least a number of the data packet assigned thereto.

* * * * *

UNITED STATES PATENT AND TRADEMARK OFFICE
CERTIFICATE OF CORRECTION

PATENT NO. : 7,450,587 B2  Page 1 of 1
APPLICATION NO. : 10/204036
DATED : November 11, 2008
INVENTOR(S) : Thomas Gruhn et al.

It is certified that error appears in the above-identified patent and that said Letters Patent is hereby corrected as shown below:

Title Page, Item (54) Title: after "PACKET" insert --DATA--.

Title Page, Item (56) (Other Publications), Line 3, change "Seimens" to --Siemens--.

Column 1 (Title), Line 1, after "PACKET" insert --DATA--.

Column 11, Line 65, change "so)" to --s(j)--.

Signed and Sealed this

Twenty-fourth Day of February, 2009

JOHN DOLL
*Acting Director of the United States Patent and Trademark Office*